(12) United States Patent
Kondo et al.

(10) Patent No.: US 9,618,078 B2
(45) Date of Patent: Apr. 11, 2017

(54) VIBRATION ISOLATOR

(71) Applicants: KURASHIKI KAKO CO., LTD., Kurashiki-shi (JP); KABUSHIKI KAISHA TOYOTA JIDOSHOKKI, Kariya-shi (JP)

(72) Inventors: Yoshinori Kondo, Kurashiki (JP); Kazuo Miyake, Kurashiki (JP); Sumio Uchida, Kurashiki (JP); Hidehito Kondo, Kariya (JP)

(73) Assignees: KURASHIKI KAKO CO., LTD., Kurashiki-Shi, Okayama (JP); KABUSHIKI KAISHA TOYOTA JIDOSHOKKI, Kiraya-Shi, Aichi (JP)

( * ) Notice: Subject to any disclaimer, the term of this patent is extended or adjusted under 35 U.S.C. 154(b) by 0 days.

(21) Appl. No.: 14/640,368

(22) Filed: Mar. 6, 2015

(65) Prior Publication Data
US 2015/0252871 A1   Sep. 10, 2015

(30) Foreign Application Priority Data
Mar. 6, 2014   (JP) .................................. 2014-044211

(51) Int. Cl.
*F16F 15/08* (2006.01)
*F16F 1/36* (2006.01)
(Continued)

(52) U.S. Cl.
CPC ................ *F16F 15/08* (2013.01); *F16F 1/36* (2013.01); *F16F 1/373* (2013.01); *B60K 5/1216* (2013.01);
(Continued)

(58) Field of Classification Search
CPC .......... F16F 1/3713; F16F 1/376; F16F 15/08; F16F 1/44; F16F 1/50; F16F 1/54
(Continued)

(56) References Cited

U.S. PATENT DOCUMENTS 3,734,554 A * 5/1973 Schwabenlender ..... B60R 19/26
267/140
6,105,944 A * 8/2000 David ..................... F16F 1/387
267/140.11
(Continued)

FOREIGN PATENT DOCUMENTS

CN    101541580 A    9/2009
CN    101960165 A    1/2011
(Continued)

*Primary Examiner* — Thomas Irvin
(74) *Attorney, Agent, or Firm* — Knobbe Martens Olson & Bear LLP

(57) ABSTRACT

A vibration isolator includes: a pair of opposing members fixed to a vehicle body of the vehicle to be located on both sides of a protrusion protruding from an outer circumferential edge of the power train in a direction perpendicular to the principal axes of inertia to oppose to each other in the direction about the principal axes of inertia; a precompressed part provided on part of each of the opposing members facing the protrusion to be precompressed by the opposing member and the protrusion in the direction about the principal axes of inertia; and a contacting part provided on part of each of the opposing members facing the protrusion to be spaced from the protrusion, and contacts the protrusion when the power train vibrates in the direction about the principal axes of inertia.

6 Claims, 13 Drawing Sheets

(51) Int. Cl.
 *F16F 1/373* (2006.01)
 *F16F 1/44* (2006.01)
 *F16F 1/371* (2006.01)
 *F16F 1/54* (2006.01)
 *F16F 1/376* (2006.01)
 *B60K 5/12* (2006.01)

(52) U.S. Cl.
 CPC ............. *F16F 1/376* (2013.01); *F16F 1/3713* (2013.01); *F16F 1/44* (2013.01); *F16F 1/54* (2013.01)

(58) Field of Classification Search
 USPC ............... 267/136, 140, 140.11, 140.13, 141
 See application file for complete search history.

(56) References Cited

U.S. PATENT DOCUMENTS

| | | | | |
|---|---|---|---|---|
| 6,189,874 | B1 * | 2/2001 | Carlson | F16F 1/3842 248/638 |
| 6,361,030 | B1 * | 3/2002 | Rogge | F16F 1/371 267/136 |
| 6,394,432 | B1 * | 5/2002 | Whiteford | F16F 13/24 267/140 |
| 7,185,723 | B2 * | 3/2007 | Aoyama | B60K 5/1208 180/300 |
| 8,308,147 | B2 * | 11/2012 | Kojima | F16F 13/107 267/140.12 |
| 8,702,074 | B2 * | 4/2014 | Fursdon | F16F 13/266 248/550 |
| 9,027,912 | B2 * | 5/2015 | Hibi | F16F 15/08 248/635 |
| 2004/0245037 | A1 | 12/2004 | Aoyama et al. | |
| 2007/0228624 | A1 | 10/2007 | Okanaka et al. | |
| 2010/0059912 | A1 | 3/2010 | Takakura | |
| 2011/0031669 | A1 | 2/2011 | Sasaki | |
| 2012/0228814 | A1 | 9/2012 | Higashi | |

FOREIGN PATENT DOCUMENTS

| | | |
|---|---|---|
| CN | 102673592 A | 9/2012 |
| CN | 203063649 U | 7/2013 |
| JP | 58-88245 A | 5/1983 |
| JP | 62-113930 A | 5/1987 |
| JP | 63-33572 B2 | 7/1988 |
| JP | H03-588 Y2 | 1/1991 |
| JP | H05-302637 A | 11/1993 |
| JP | H06-147245 A | 5/1994 |
| JP | H07-23634 A | 1/1995 |
| JP | 2003-240037 A | 8/2003 |
| JP | 2004-314945 A | 11/2004 |
| JP | 3679896 B2 | 5/2005 |
| JP | 4032512 B2 | 11/2007 |
| JP | 2009-298316 A | 12/2009 |
| JP | 4810523 B2 | 8/2011 |

* cited by examiner

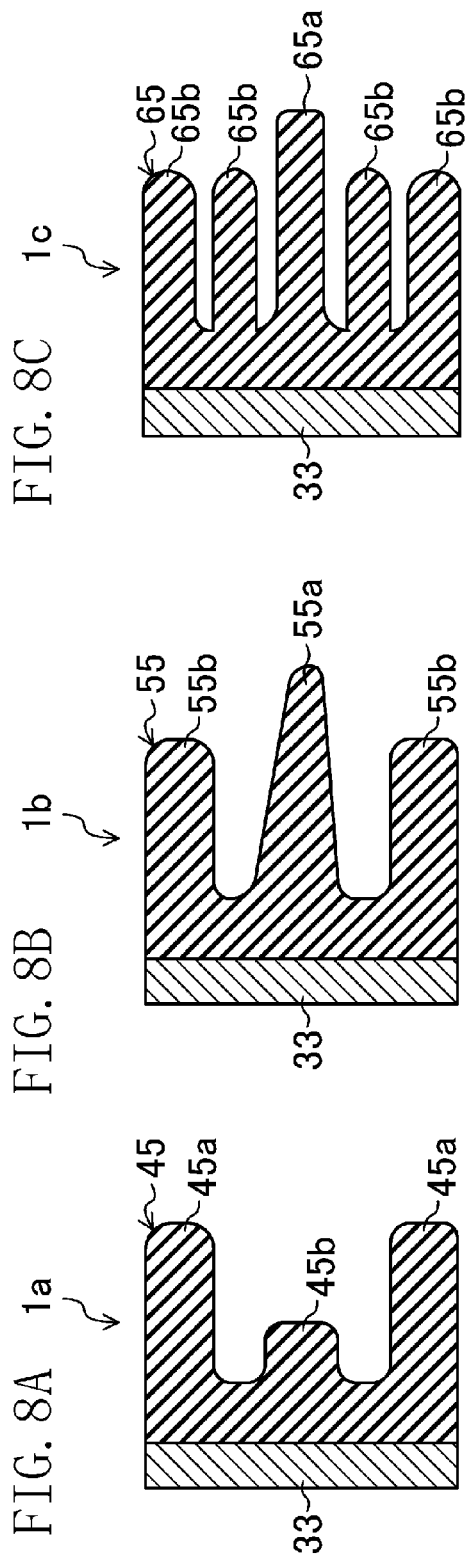

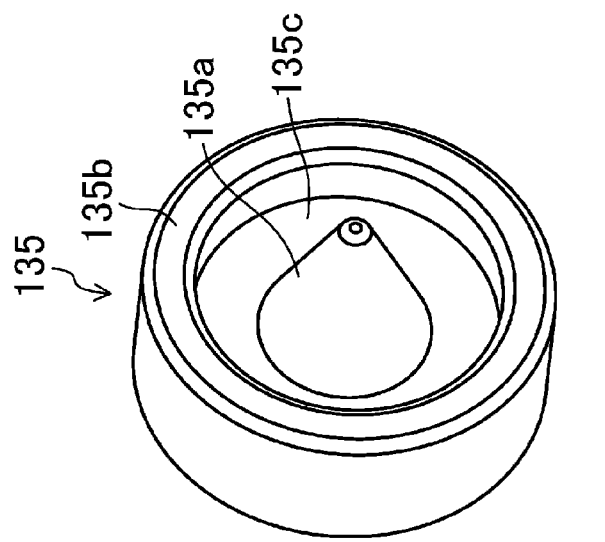
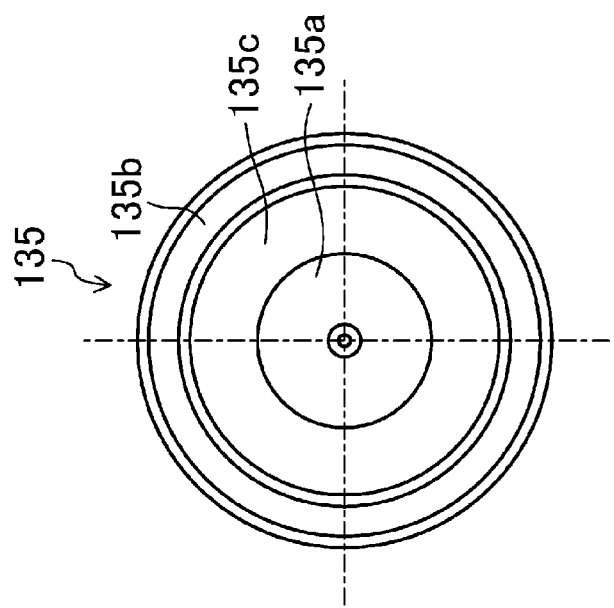
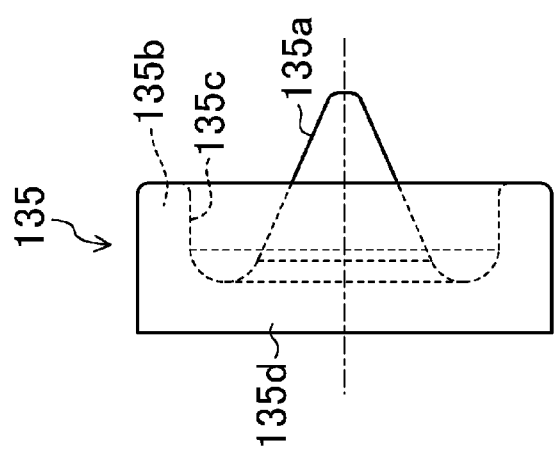

VIBRATION ISOLATOR

CROSS-REFERENCE TO RELATED APPLICATION

This application claims priority to Japanese Patent Application No. 2014-044211 filed on Mar. 6, 2014, the entire disclosure of which is incorporated by reference herein.

BACKGROUND

A technology disclosed in the present specification relates to a vibration isolator, particularly to a vibration isolator configured to reduce vibration of a power train mounted on a vehicle in a roll direction.

Japanese Examined Utility Model Publication No. H03-588 discloses an example of a vibration isolator for reducing vibration of a transmission integrated with an engine. The vibration isolator includes a stopper tab which is made of a steel sheet and U-shaped in cross section, bolted to the transmission and extends along an output shaft of the engine, and a U-shaped member made of steel sheet and provided on a vehicle body.

The stopper tab includes a pair of side plates facing each other in a horizontal direction, and vibrates in the horizontal direction, i.e., in a direction in which the side plates face each other, when the transmission relatively greatly vibrates when the engine is turned on/off, for example. An insulator rubber in the shape of a rectangular frame when viewed in plan is attached to an outer surface of each of the side plates.

The U-shaped member is arranged to surround the side plates of the stopper tab when viewed in plan. Side plates of the U-shaped member face the insulator rubbers with a gap interposed therebetween.

When the engine is turned on/off, the transmission vibrates in a direction perpendicular to the output shaft of the engine. At this time, the insulator rubbers contact the side plates of the U-shaped member to reduce the vibration of the transmission.

SUMMARY

When a drive output (torque) of the engine greatly varies, e.g., when the engine is turned on/off, the whole power train vibrates with a relatively large amplitude in a roll direction (a direction about principal axes of inertia) due to a reaction force (torque). To reduce the vibration in the roll direction with the vibration isolator, the stopper tab is provided on an outer periphery of the transmission to be perpendicular to the principal axes of inertia, and the U-shaped member is fixed to the vehicle body so that the side plates of the U-shaped member are arranged on both sides of the stopper tab in the roll direction. Thus, when the vibration in the roll direction is generated, the insulator rubbers attached to the stopper tab contact the side plates of the U-shaped member, thereby reducing the vibration of the power train in the roll direction.

However, according to the above-described vibration isolator, a gap is formed between the insulator rubbers and the side plates of the U-shaped member. Thus, when the vibration in the roll direction is generated, the insulator rubbers collide with the side plates of the U-shaped member, and impact of the collision may possibly be transmitted to the vehicle body. Moreover, the collision may generate noise.

In view of the foregoing, the disclosed technology has been achieved to prevent the vibration of the power train mounted on the vehicle in the roll direction from transmitting to the vehicle body.

For the above-described purpose, the disclosed technology provides the power train with a protrusion extending in a direction substantially perpendicular to the principal axes of inertia, and elastic bodies arranged on both sides of the protrusion in the roll direction are precompressed.

Specifically, the disclosed technology is directed to a vibration isolator configured to reduce vibration of the power train mounted on the vehicle in the direction about the principal axes of inertia, and provides the following solution.

Specifically, the vibration isolator of the disclosed technology includes: a pair of opposing members fixed to a vehicle body of the vehicle to be located on both sides of a protrusion protruding from an outer circumferential edge of the power train in a direction perpendicular to the principal axes of inertia to oppose to each other in the direction about the principal axes of inertia; a precompressed part provided on part of each of the opposing members facing the protrusion to be precompressed by the opposing member and the protrusion in the direction about the principal axes of inertia; and a contacting part provided on part of each of the opposing members facing the protrusion to be spaced from the protrusion, and contacts the protrusion when the power train vibrates in the direction about the principal axes of inertia.

In this structure, the protrusion vibrates in the roll direction as the power train vibrates in the roll direction. At this time, the protrusion compresses the precompressed part in the roll direction because the precompressed part has been compressed in the roll direction by the protrusion and the opposing members. Thus, the protrusion gently rotates in the roll direction. When the protrusion further rotates in the roll direction, the protrusion contacts the contacting part. At this time, the protrusion gently rotating in the roll direction as described above gently contacts the contacting part. Thus, collision of the protrusion with the contacting part can be prevented. This can prevent transmission of the vibration of the power train in the roll direction to the vehicle body, and can prevent generation of noise of the collision.

The principal axes of inertia preferably extend in a substantially horizontal direction, a protruding direction of the protrusion preferably intersects with the horizontal direction, and the precompressed parts and the contacting parts preferably extend in a direction substantially perpendicular to the protrusion.

In this structure, the protruding direction of the protrusion intersects with the horizontal direction, and the precompressed parts and the contacting parts extend in the direction substantially perpendicular to the protruding direction of the protrusion. Thus, when the power train vibrates in a vertical direction while the vehicle is driven, for example, the protrusion also vibrates in the vertical direction. At this time, the precompressed parts and the contacting parts warp to deform in a substantially shear direction. Accordingly, the vibration of the power train in the vertical direction is not easily transmitted to the vehicle body through the elastic bodies (the precompressed parts) and the opposing members. This can improve a property of the vibration isolator of preventing the transmission of the vibration in the vertical direction.

Parts of the protrusion facing the opposing members are preferably flat along the protruding direction of the protrusion, and the precompressed parts preferably extend to be closer to the protrusion than the contacting parts.

In this structure, the parts of the protrusion facing the opposing members are flat. Thus, the shape of the protrusion is relatively simple. Although the changing of the shape of the power train of the vehicle is relatively difficult, the relatively simple shape of the protrusion makes it possible to easily change the shape of the power train.

A gap is preferably formed between the precompressed part and the contacting part provided on the same opposing member.

In this structure, the precompressed parts and the contacting parts easily warp in the shear direction because the gap is formed between the precompressed part and the contacting part provided on the same opposing member. Thus, when the power train vibrates in the vertical direction, the precompressed parts and the contacting parts easily warp in the shear direction, and a spring constant of the vibration isolator in the vertical direction can be reduced. This can further improve the property of the vibration isolator of preventing transmission of the vibration.

An end of one of the opposing members and an end of the other opposing member on one side in a direction of the principal axes of inertia are preferably coupled by a coupling member, and a projection for positioning the protrusion in the direction of the principal axes of inertia is preferably formed on part of the coupling member facing the protrusion.

In this structure, the vibration isolator is brought closer to the vehicle body from one side of the protrusion in the direction of the principal axes of inertia in mounting the vibration isolator on the vehicle body. At this time, the positioning projection contacts the protrusion to determine the position of the vibration isolator in the direction of the principal axes of inertia. This facilitates the mounting of the vibration isolator.

The disclosed technology can prevent the transmission of the vibration of the power train in the roll direction to the vehicle body.

BRIEF DESCRIPTION OF THE DRAWINGS

FIG. 8A is view corresponding to a cross-sectional view taken along the line VIII-VIII in FIG. 6D showing a vibration isolator of a first alternative of the example embodiment.

FIG. 8B is a view corresponding to the cross-sectional view taken along the line VIII-VIII in FIG. 6D showing a vibration isolator of a second alternative of the example embodiment.

FIG. 8C is a view corresponding to the cross-sectional view taken along the line VIII-VIII in FIG. 6D showing a vibration isolator of a third alternative of the example embodiment.

FIG. 8D is a view corresponding to the cross-sectional view taken along the line VIII-VIII in FIG. 6D showing a vibration isolator of a fourth alternative of the example embodiment.

FIG. 8E is a view corresponding to the cross-sectional view taken along the line VIII-VIII in FIG. 6D showing the vibration isolator of the fourth alternative of the example embodiment.

FIG. 11A is a perspective view showing a stopper rubber of a vibration isolator of a tenth alternative of the example embodiment.

FIG. 11B is a front view showing the stopper rubber of the vibration isolator of the tenth alternative of the example embodiment.

FIG. 11C is a side view showing the stopper rubber of the vibration isolator of the tenth alternative of the example embodiment.

DETAILED DESCRIPTION

An example embodiment will be described with reference to the drawings.

A vibration isolator 1 of the example embodiment is a vibration isolator applied to a common vehicle 3.

Figure 1:
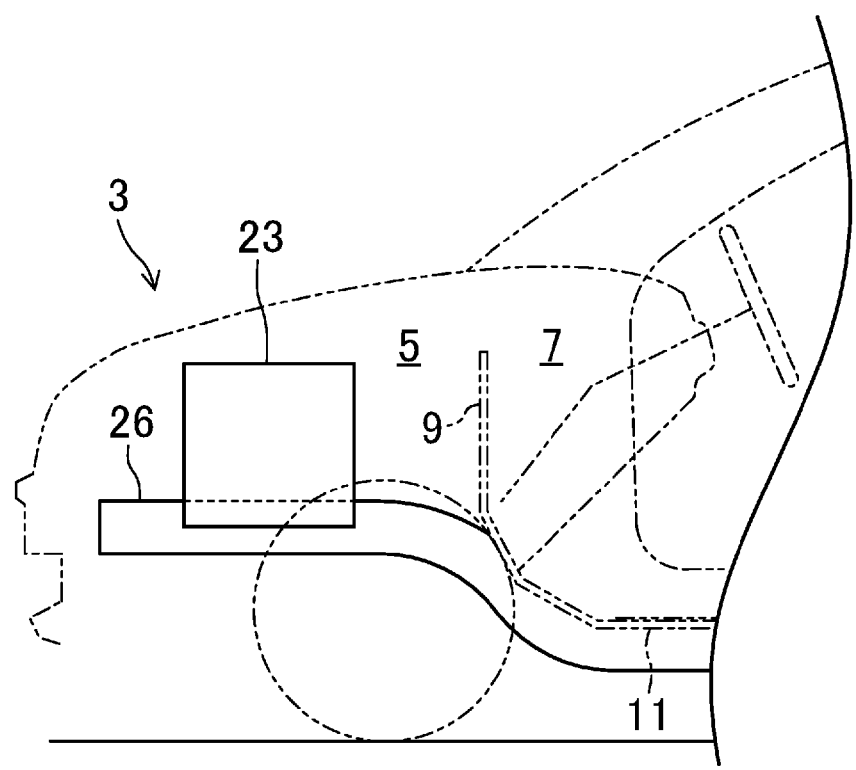
FIG. 1 is a side view showing a vehicle equipped with a vibration isolator of an example embodiment.

FIG. 1 is a side view showing the vehicle 3. A lower dash panel 9 dividing an engine compartment 5 and a cabin 7 in a longitudinal direction of the vehicle 3 is provided in a front part of the vehicle 3. A floor panel 11 is connected to a lower end of the lower dash panel 9 to extend rearward in a substantially horizontal direction.

A power train 23 including an engine, a transmission 21 (see FIG. 2A), etc. is arranged in the engine compartment 5. The power train 23 is supported by a pair of front side frames 25, 26 extending in the longitudinal direction of the vehicle on both sides of the engine compartment 5 in a width direction of the vehicle.

FIG. 1 schematically shows an outline of the vehicle 3 and components except for the power train 23 and the front side frame 26 by virtual lines.

Figure 2A:
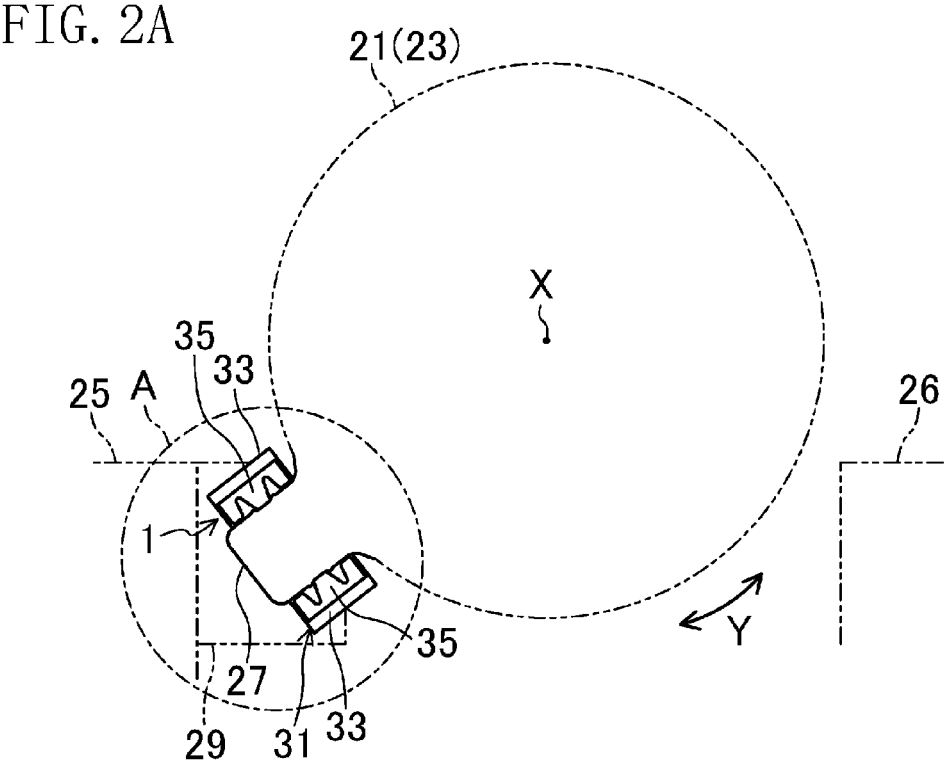
FIG. 2A is a schematic view showing a transmission attached with the vibration isolator of the example embodiment as viewed from a front side of the vehicle.

FIG. 2A is a schematic view showing the power train 23 as viewed from a front side of the vehicle. FIG. 2A schematically shows an outline of the transmission 21. When a drive output of the engine greatly varies, e.g., when the engine is turned on/off, the power train 23 vibrates due to a reaction force with a relatively large amplitude in a direction about principal axes of inertia X, i.e., in a roll direction (in directions of arrows Y shown in FIG. 2A). The power train 23 is provided with the vibration isolator 1 configured to reduce the vibration in the roll direction.

A vehicle body of the vehicle 3 includes a pair of side frames 25, 26 which are made of steel sheets, arranged on both sides of the vehicle in the width direction of the vehicle to face each other, and extend in the longitudinal direction of the vehicle. The power train 23 has the principal axes of inertia X extending in a horizontal direction, and is supported on the side frames 25, 26 by a vibration isolator mount (not shown).

Figure 2B:
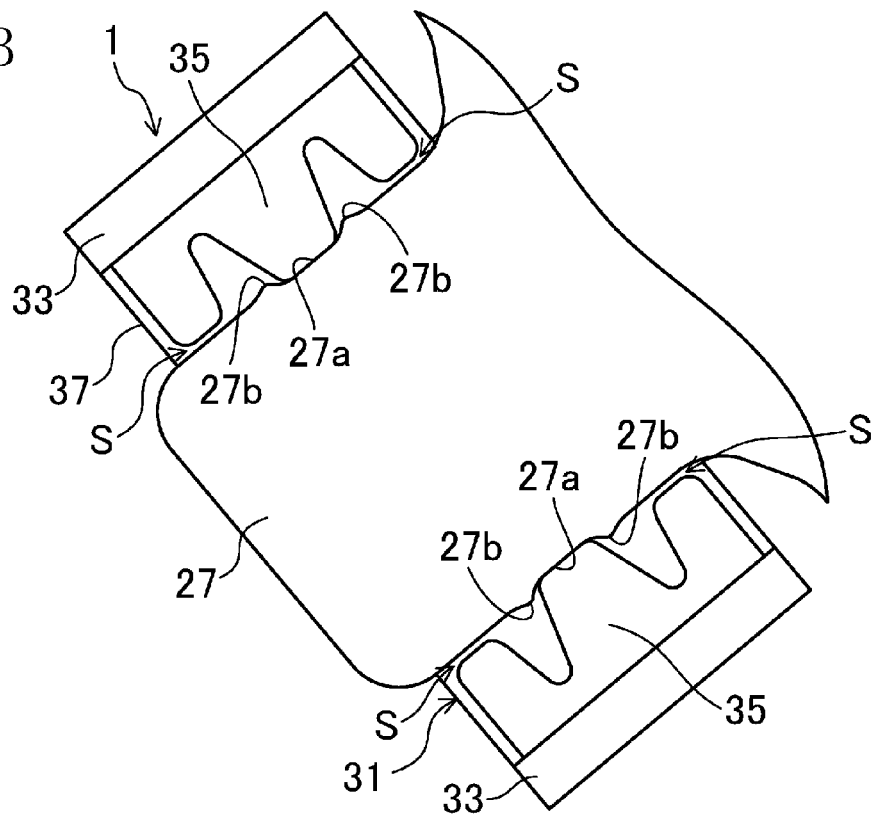
FIG. 2B is an enlarged view showing part A in FIG. 2A.

A protruding tab (a protrusion) 27 is integrally formed on an outer peripheral edge of the transmission 21 of the power train 23 to extend in a direction perpendicular to the horizontal direction, i.e., in a direction perpendicular to the principal axes of inertia X of the power train 23. Specifically, the protruding tab 27 extends obliquely downward to approach one of the side frames (the left side frame 25 in FIG. 2A). FIG. 2B is an enlarged view showing part A in FIG. 2A. The protruding tab 27 is constituted of a substantially rectangular parallelepiped metallic block, and end faces 27a, 27a thereof (parts of the protrusion facing the opposing members) facing the roll direction are flat along the protruding direction of the protruding tab 27. Each of the end faces 27a, 27a has a pair of linear ridges 27b, 27b which are formed at the center of the end face 27a in the protruding direction to be spaced from each other in the protruding direction, and extend along the principal axes of inertia X. A mount 29 to which the vibration isolator 1 is bolted is provided on part of the side frame 25 forward of the protruding tab 27 in the longitudinal direction of the vehicle (see FIG. 2A).

Figure 3:
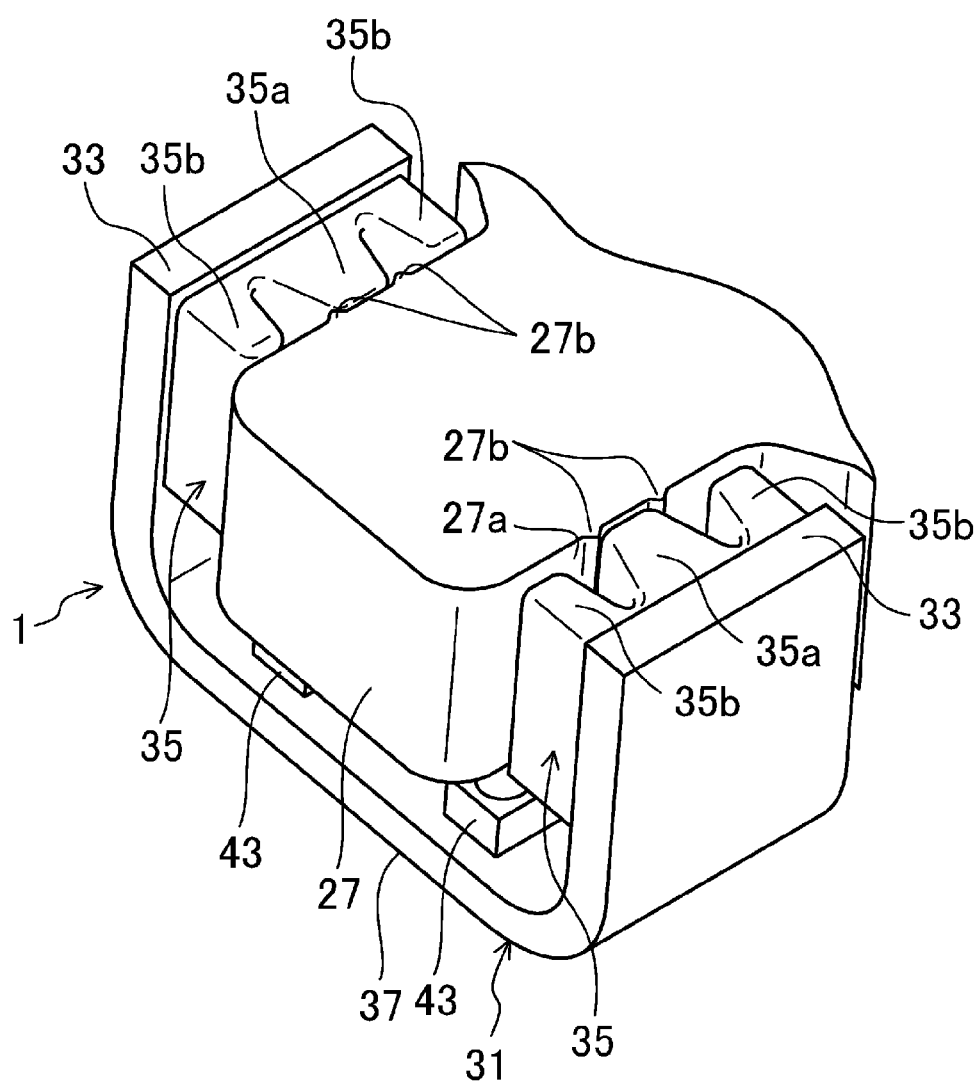
FIG. 3 is a perspective view of the part A in FIG. 2A as viewed from the front side of the vehicle.
Figure 4:
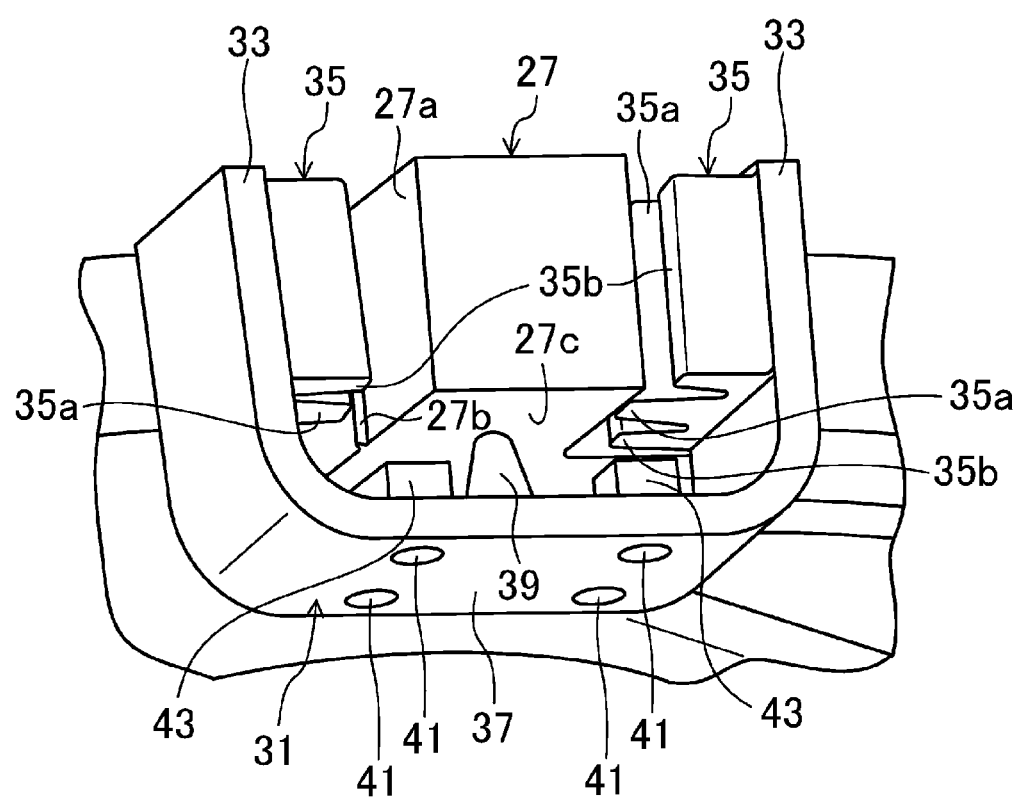
FIG. 4 is a perspective view showing the part A in FIG. 2A as viewed from a rear side of the vehicle.
Figure 5:
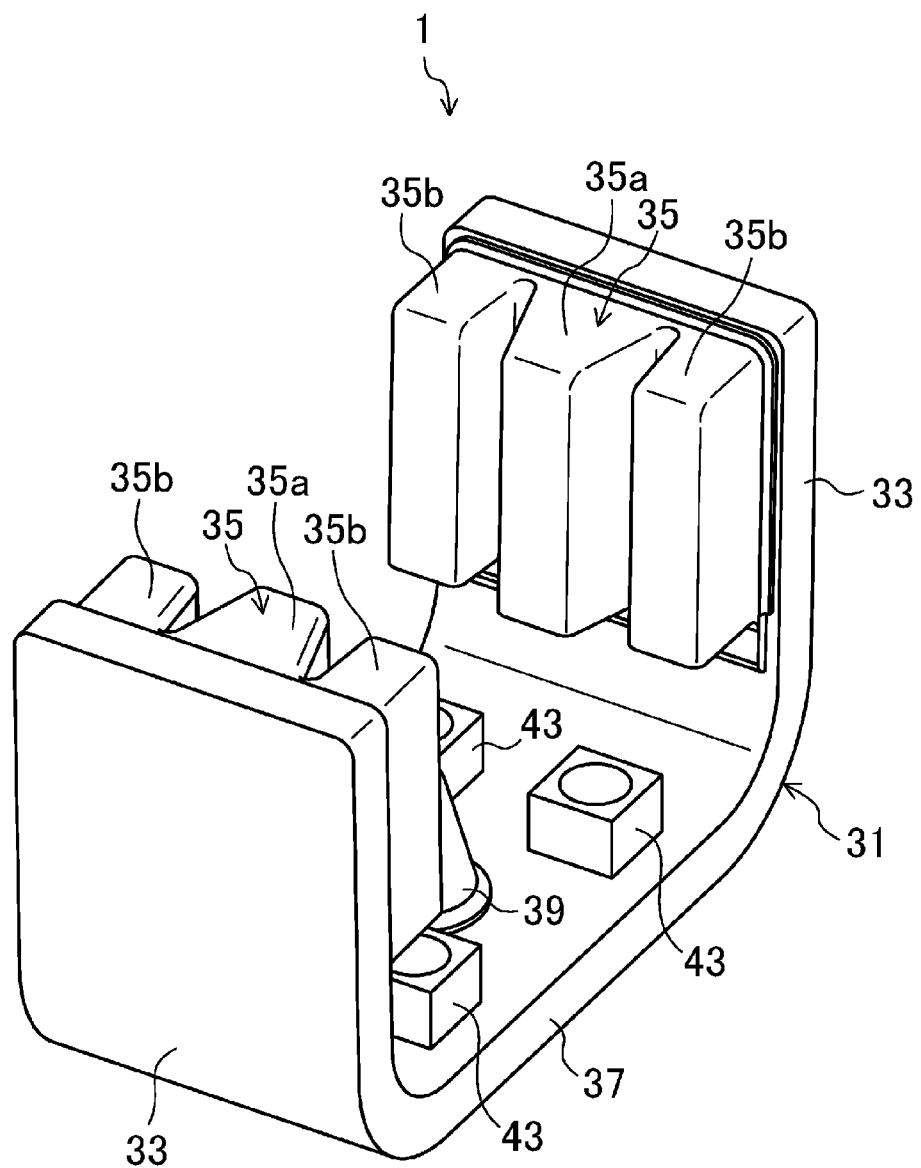
FIG. 5 is a perspective view showing the vibration isolator.
Figure 6:
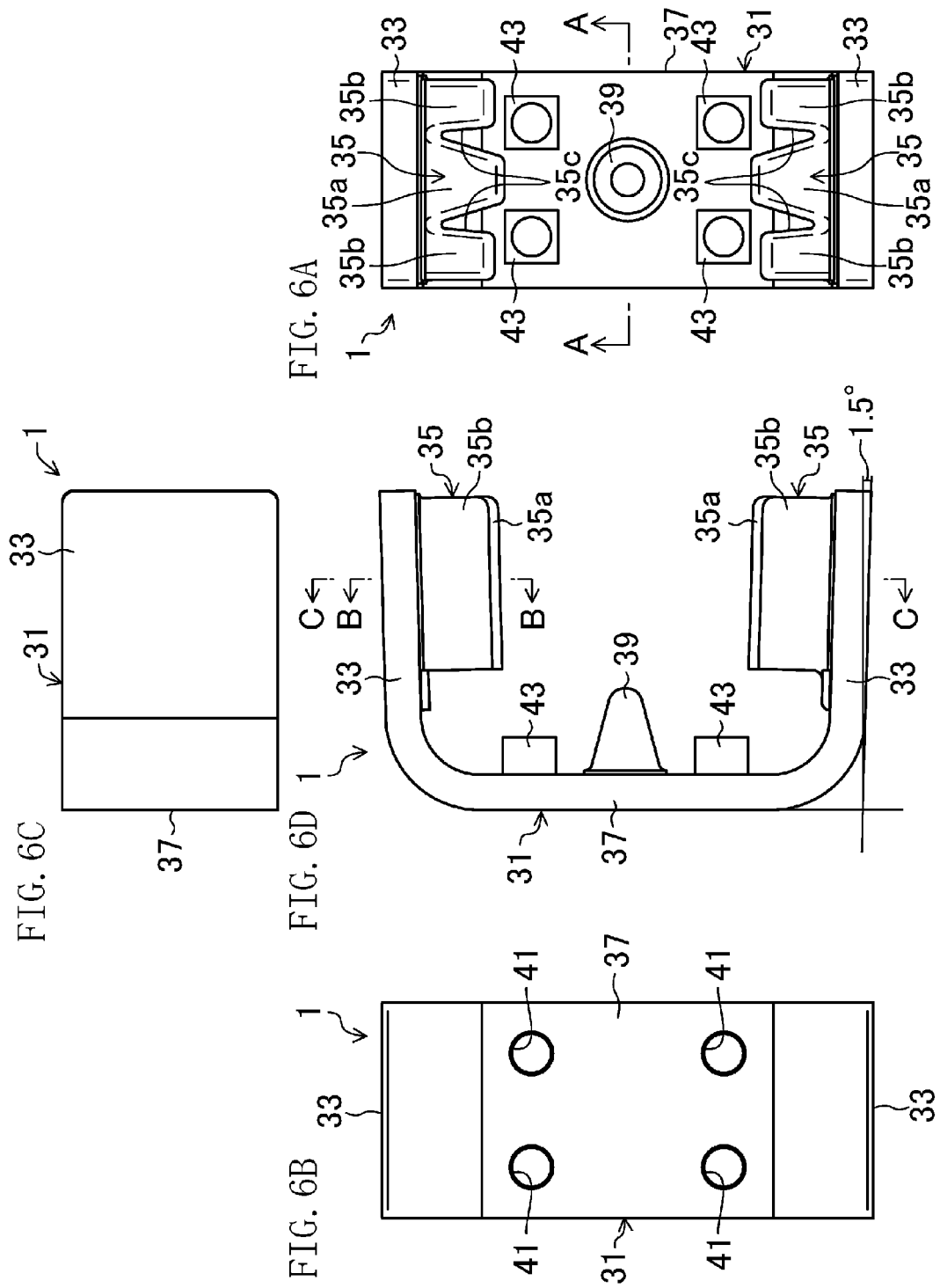
FIG. 6A is a plan view showing the vibration isolator.
FIG. 6B is a bottom view showing the vibration isolator.
FIG. 6C is a front view showing the vibration isolator.
FIG. 6D is a side view showing the vibration isolator.
Figure 7:
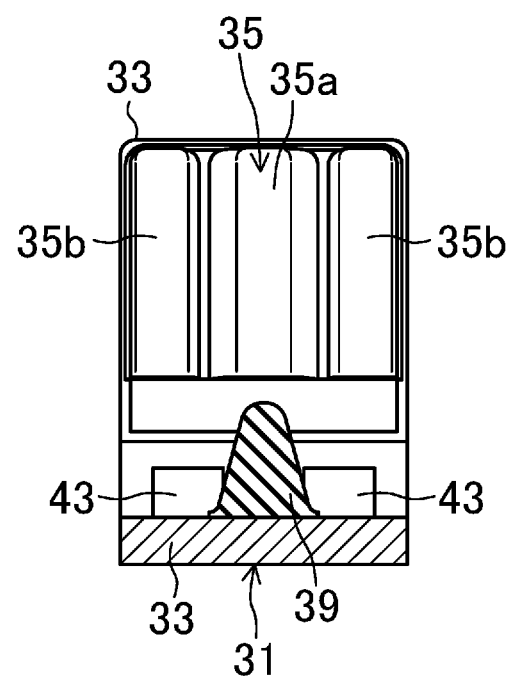
FIG. 7 is a cross-sectional view taken along the line VII-VII in FIG. 6A.

FIGS. 3 and 4 show the part A in FIG. 2A as viewed from front and rear sides, respectively. FIG. 5 is a perspective view showing the vibration isolator 1. FIG. 6A is a plan view showing the vibration isolator 1, FIG. 6B is a bottom view showing the vibration isolator 1, FIG. 6C is a front view showing the vibration isolator 1, and FIG. 6D is a left side view showing the vibration isolator 1. FIG. 7 is a cross-sectional view taken along the line VII-VII in FIG. 6A. A back view and a right side view of the vibration isolator 1 are not shown because they are substantially the same as the front view and the left side view.

The vibration isolator 1 has a bracket 31 having a U-shaped cross section and fixed to the side frame 25, and stopper rubbers 35, 35 arranged on inner surfaces of a pair of opposing parts (opposing members) 33, 33 of the bracket 31.

The bracket 31 is formed by bending a rectangular steel sheet into the U-shape, and has the opposing parts 33, 33 in the shape of a rectangular plate and oppose to each other, and a coupling part 37 (a coupling member) in the shape of a rectangular plate and couples an end of one of the opposing parts 33 and an end of the other opposing part 33 on one side in the longitudinal direction of the opposing parts 33, 33.

A projection 39 made of a substantially conical elastic body is formed on the center of a surface of the coupling part 37 facing the opposing parts 33 as shown in FIG. 4, etc. Bolt holes 41, 41, . . . for receiving bolts (not shown) for fastening the bracket 31 to the side frame 25 are formed in the coupling part 37 between four corners of the coupling part 37 and the projection 39 to be located closer to the projection 39 than to the four corners. Weld nuts 43 are provided on the surface of the coupling part 37 facing the opposing parts 33 to correspond to the bolt holes 41.

A junction between each of the opposing parts 33 and the coupling part 37 is curved, and each of the opposing parts 33 is tilted outward by 1.5 degrees relative to a direction perpendicular to the coupling part 37. The opposing parts 33, 33 are fixed to the side frame 25 through the coupling part 37.

Each of the stopper rubbers 35 includes three ribs 35a, 35b, 35b arranged in a width direction of the opposing parts 33. Each of the ribs 35a, 35b, 35b extends linearly in a longitudinal direction of the opposing parts 33. A first rib 35a in the middle of the three ribs 35a, 35b, 35b (a precompressed part) has a dimension larger than second ribs 35b, 35b (contacting parts) on both sides of the first rib 35a in a protruding direction thereof. The first rib 35a has a trapezoidal cross section, and surfaces facing the second ribs 35b are inclined such that a width of the first rib 35a increases with a decreasing distance from a bottom of the first rib 35a. Each of the second ribs 35b has a substantially rectangular cross section, and a surface facing the first rib 35a is inclined such that a width of the second rib 35b increases with a decreasing distance from a bottom of the second rib 35b. A surface of the second rib 35b opposite to the surface facing the first rib 35a extends along the direction in which the opposing parts 33, 33 oppose to each other. Linear grooves 35c, 35c (gap) extending in the longitudinal direction of the opposing parts 33 are formed between each of the second ribs 35b, 35b and the first rib 35a. Each of the linear grooves 35c is tapered toward the bottom thereof.

The vibration isolator 1 configured as described above is fixed to the vehicle body of the vehicle 3 by fastening the coupling part 37 to the mount 29 of the side frame 25 with the bolts with an opening of the U-shaped bracket 31 facing the longitudinal direction of the vehicle, and the pair of opposing parts 33, 33 opposing to the protruding tab 27 of the transmission 21. In the fixed state, each of the opposing parts 33 are arranged to be parallel to the end faces 27a of the protruding tab 27 facing the opposing parts 33.

In this state, the first rib 35a of the stopper rubber 35 provided on each of the opposing parts 33 extends in a direction perpendicular to the protruding direction of the protruding tab 27, and is pressed to contact the end face 27a. In other words, the first rib 35a is precompressed in the roll direction by the protruding tab 27 and the opposing part 33. The ridges 27b, 27b formed on the end face 27a of the protruding tab 27 are located on both sides of a tip of the first rib 35a in the width direction. This can prevent misalignment of the first rib 35a in the width direction.

With the bolts fastened, each of the second ribs 35b of the stopper rubber 35 provided on the opposing part 33 is spaced from the protruding tab 27 to form a gap S between the second rib 35b and the end face 27a facing the second rib 35b.

The projection 39 formed on the coupling part 37 of the bracket 31 contacts a front end face 27c of the protruding tab 27. Thus, the vibration isolator 1 is positioned in the longitudinal direction of the vehicle.

A behavior of the vibration isolator 1 in response to an on/off operation of the engine is described below. When the engine is turned on or off, the drive output of the engine greatly varies, and the power train 23 vibrates in the roll direction with a relatively large amplitude due to a reaction force.

In an early stage of the vibration, the protruding tab 27 which is part of the power train 23 rotates in the roll direction. However, since the first rib 35*a* of the stopper rubber 35 located on one side of the protruding tab 27 in the roll direction is precompressed, the protruding tab 27 compresses the first rib 35*a*. Thus, the protruding tab 27 gently rotates in the roll direction.

As the protruding tab 27 further rotates toward the one side in the roll direction, the protruding tab 27 contacts the second ribs 35*b*, 35*b* of the stopper rubber 35 located on the one side of the protruding tab 27 in the roll direction. At this time, the protruding tab 27 gently rotating in the roll direction as described above gently contacts the second ribs 35*b*, 35*b*.

Thus, the vibration isolator 1 can prevent the protruding tab 27 from greatly rotating in the roll direction, and can prevent the protruding tab 27 from colliding with the second ribs 35*b*, 35*b*. This can prevent transmission of the relatively large vibration of the power train 23 in the roll direction to the vehicle body of the vehicle 3, and can prevent generation of noise of the collision.

A protruding direction of the protruding tab 27 intersects with the horizontal direction. The first rib 35*a* and the second ribs 35*b*, 35*b* of the stopper rubber 35 above the protruding tab 27, and the first rib 35*a* and the second ribs 35*b*, 35*b* of the stopper rubber 35 below the protruding tab 27 extend in a direction perpendicular to the protruding tab 27. Specifically, the first ribs 35*a*, 35*a* and the second ribs 35*b*, 35*b*, 35*b*, 35*b* extend in a direction intersecting with the vertical direction. For example, the protruding tab 27 vibrates in the vertical direction as the power train 23 vibrates in the vertical direction while the vehicle 3 is driven. At this time, the first ribs 35*a* and the second ribs 35*b*, 35*b*, 35*b*, 35*b* warp to deform in a substantially shear direction. Thus, the vibration of the power train 23 in the vertical direction is not easily transmitted to the vehicle body through the stopper rubbers 35, 35 and the bracket 31. This can improve a property of the vibration isolator 1 of preventing the transmission of the vibration in the vertical direction.

Advantages of Example Embodiment

The embodiment described above can prevent the collision of the protruding tab 27 with the second ribs 35*b*, 35*b*. This can prevent transmission of the vibration of the power train 23 in the roll direction to the vehicle body of the vehicle 3, and can prevent the generation of noise of the collision.

The embodiment described above can improve the property of the vibration isolator 1 of preventing the transmission of the vibration in the vertical direction as described above.

According to the embodiment described above, the end faces 27*a*, 27*a* of the protruding tab 27 facing the opposing parts 33, 33 are flat, and therefore, the shape of the protruding tab 27 is relatively simple. Although the changing of the shape of the power train 23 of the vehicle 3 is relatively difficult, the relatively simple shape of the protruding tab 27 makes it possible to easily change the shape of the power train 23.

According to the embodiment described above, the grooves 35*c*, 35*c* are formed as gaps between the first rib 35*a* and each of the second ribs 35*b*, 35*b*, and the first and second ribs 35*a*, 35*b*, 35*b* easily warp in the shear direction. Thus, when the power train 23 vibrates in the vertical direction, the first rib 35*a* and the second ribs 35*b*, 35*b* easily warp in the shear direction. Thus, a spring constant of the vibration isolator 1 in the vertical direction can be reduced.

According to the embodiment described above, the vibration isolator 1 is brought closer to the side frame 25 from the rear side of the protruding tab 27 in mounting the vibration isolator 1 on the side frame 25. At this time, the projection 39 contacts the protruding tab 27 to determine the position of vibration isolator 1 in the longitudinal direction. This facilitates the mounting of the vibration isolator 1.

The embodiment described above can effectively reduce the vibration of the transmission 21 of the vehicle 3 in the roll direction.

According to the embodiment described above, the shape of the bracket 31 can be changed as appropriate. Thus, a volume of the stopper rubbers 35 is not limited.

(First Alternative)

FIG. 8A is a view corresponding to the cross-sectional view taken along the line VIII-VIII in FIG. 6D showing a vibration isolator 1*a* of a first alternative of the above-described embodiment. The vibration isolator 1*a* has stopper rubbers 45 of a shape different from the stopper rubbers 35 of the vibration isolator 1 of the above-described embodiment. Specifically, each of the stopper rubbers 45 includes a second rib 45*b* formed at the center in a width direction thereof, and first ribs 45*a*, 45*a* which are formed on both sides of the second rib 45*b* in the width direction, and have a dimension larger than the second rib 45*b* in a protruding direction thereof.

In this structure, the first ribs 45*a*, 45*a* on both sides of the second rib 45*b* are precompressed by the protruding tab 27 and the opposing part 33. The second rib 45*b* is spaced from the protruding tab 27, and contacts the protruding tab 27 when the power train 23 vibrates in the roll direction.

(Second Alternative)

FIG. 8B is a view corresponding to the cross-sectional view taken along the line VIII-VIII in FIG. 6D showing a vibration isolator 1*b* of a second alternative of the embodiment. The vibration isolator 1*b* has stopper rubbers 55 of a shape different from the shape of the stopper rubbers 35 of the vibration isolator 1 of the above-described embodiment. Specifically, a first rib 55*a* is tapered to have a triangular cross section.

In this structure, when the power train 23 vibrates in the roll direction, an elastic repulsion force exerted on the protruding tab 27 gradually increases, and the rotation of the power train 23 in the roll direction gradually slows down. The elastic repulsion force applied to the protruding tab 27 by the first rib 55*a* in an early stage of the vibration of the power train 23 is smaller than the elastic repulsion force applied by the first rib 35*a* of the first embodiment, and gradually increases. Thus, the protruding tab 27 more gently contacts the second ribs 55*b*, 55*b*. This can further improve a property of the stopper rubbers.

(Third Alternative)

FIG. 8C is a view corresponding to the cross-sectional view taken along the line VIII-VIII in FIG. 6D showing a vibration isolator 1*c* of a third alternative of the above-described embodiment. The vibration isolator 1*c* has stopper rubbers 65 of a shape different from the shape of the stopper rubbers 35 of the vibration isolator 1 of the above-described embodiment. Specifically, the vibration isolator 1*c* is different from the vibration isolator 1 in that a first rib 65*a* and second ribs 65*b* of each of the stopper rubbers 65 are made smaller than the first rib 35*a* and the second ribs 35*b* of the vibration isolator 1 in the width direction thereof, and a pair of second ribs 65*b* is formed on each side of the first rib 65*a* in the width direction.

In this structure, the first rib 65a and the second ribs 65b are deformed more easily in the shear direction than the first rib 35a and the second ribs 35b, and a spring constant of the vibration isolator 1c in the vertical direction is reduced as compared with the spring constant of the vibration isolator 1.

(Fourth Alternative)

FIG. 8D and FIG. 8E are views corresponding to the cross-sectional view taken along the line VIII-VIII in FIG. 6D showing a vibration isolator 1d of a fourth alternative of the above-described embodiment. The vibration isolator 1d has stopper rubbers 75 of a shape different from the shape of the stopper rubbers 35 of the vibration isolator 1 of the above-described embodiment. Specifically, the vibration isolator 1d is different from the vibration isolator 1 in that a tip end face of the first rib 75a is provided with projections and depressions. With the provision of the projections and depressions in the tip end face of the first rib 75a, a cushioning property is given to the tip end face.

When the first rib 75a deteriorates over time, and its precompression effect is reduced, the first rib 75a contacting the protruding tab 27 easily makes noise. In the above-described structure, the tip end face of the first rib 75a has the cushioning property, and can easily reduce the noise.

(Fifth Alternative)

Figure 9A:
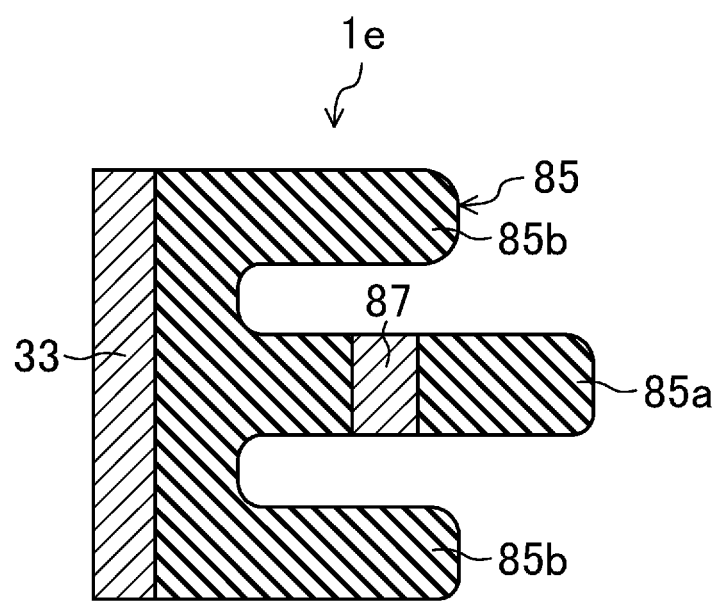
FIG. 9A is a view corresponding to the cross-sectional view taken along the line VIII-VIII in FIG. 6D showing a vibration isolator of a fifth alternative of the example embodiment.

FIG. 9A is a view corresponding to the cross-sectional view taken along the line VIII-VIII of FIG. 6D showing a vibration isolator 1e of a fifth alternative of the above-described embodiment. The vibration isolator 1e is different from the vibration isolator 1 in that stopper rubbers 85 are integrally molded with a metal plate 87. Specifically, a first rib 85a of each of the stopper rubbers 85 is integrally molded with the rectangular metal plate 87 arranged in a middle part of the first rib 85a.

In this structure, a spring constant of the first rib 85a in the protruding direction can be increased, while an increase in spring constant of the first rib 85a in the shear direction is reduced as much as possible.

In FIG. 9A, only the first rib 85a is integrally molded with the metal plate 87. However, not only the first rib 85a, but also the second ribs 85b may integrally be molded with the metal plate 87.

(Sixth Alternative)

Figure 9B:
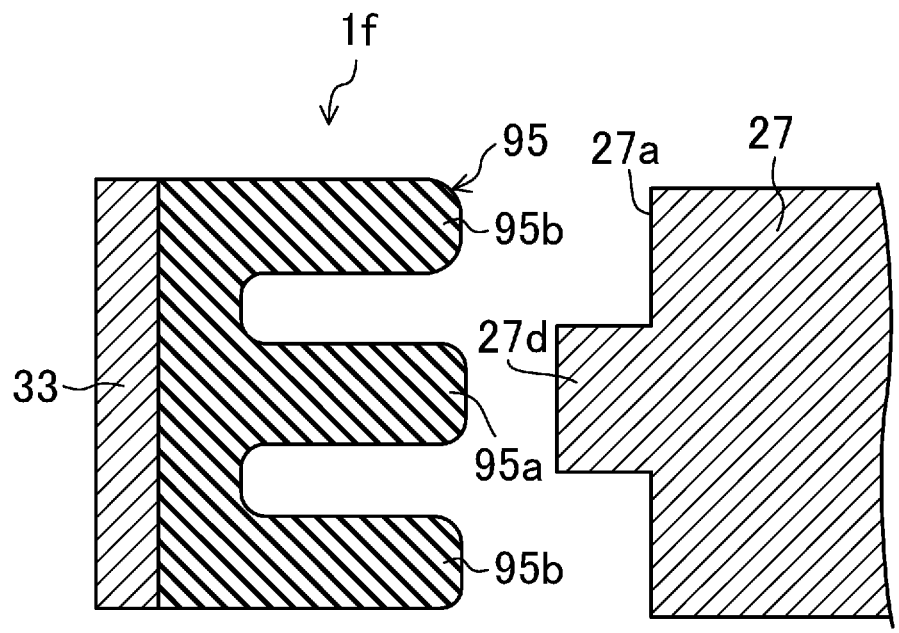
FIG. 9B is a view corresponding to the cross-sectional view taken along the line VIII-VIII in FIG. 6D showing a vibration isolator of a sixth alternative of the example embodiment.

FIG. 9B is a view corresponding to the cross-sectional view taken along the line VIII-VIII in FIG. 6D showing a vibration isolator 1f of a sixth alternative of the above-described embodiment. In this alternative, each of the end faces 27a of the protruding tab 27 is not flat, but is provided with a projection, and stopper rubbers 95 of the vibration isolator 1f are shaped to correspond to the projection.

Specifically, a projection 27d projecting toward the first rib 95a is formed on part of the end face 27a of the protruding tab 27 corresponding to a first rib 95a of the stopper rubber 95. The first rib 95a facing the protruding tab 27 has the same dimension as second ribs 95b, 95b on both sides of the first rib 95a in the protruding direction thereof.

In this structure, with the vibration isolator 1f fixed to the side frame 25, the first rib 95a is precompressed by the projection 27d of the protruding tab 27 and the opposing part 33, while a gap is formed between each of the second ribs 95b, 95b and the protruding tab 27.

(Seventh Alternative)

Figure 10A:
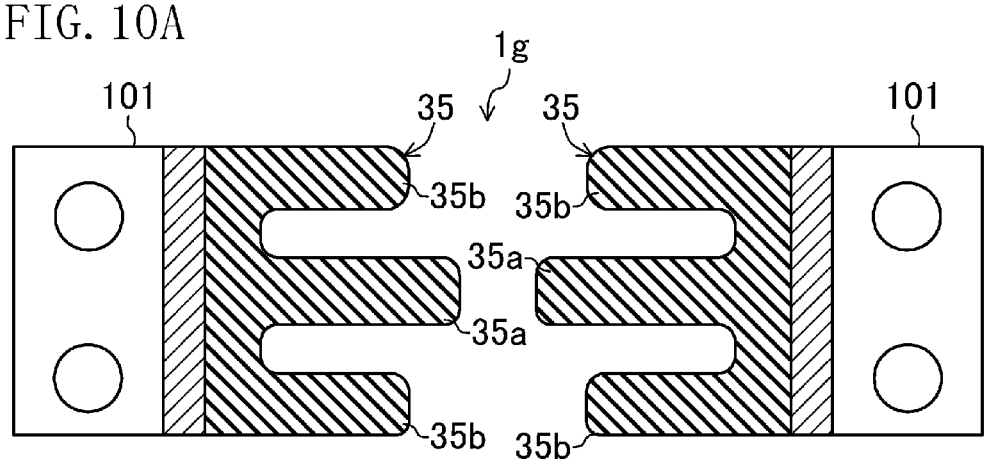
FIG. 10A is a view corresponding to a cross-sectional view taken along the line X-X in FIG. 6D showing a vibration isolator of a seventh alternative of the example embodiment.

FIG. 10A is a view corresponding to a cross-sectional view taken along the line X-X of FIG. 6D showing a vibration isolator 1g of a seventh alternative of the above-described embodiment. The vibration isolator 1g has a bracket of a shape different from the shape of the bracket 31 of the vibration isolator 1 of the above-described embodiment. Specifically, the vibration isolator 1g has a pair of brackets 101, 101 each having an L-shaped cross section. The brackets 101, 101 are arranged to sandwich the protruding tab 27 in the vertical direction.

In this structure, the brackets 101, 101 can be arranged with increased flexibility, and the position of a stopper rubber 35 provided on each of the brackets 101 can be changed as appropriate.

(Eighth Alternative)

Figure 10B:
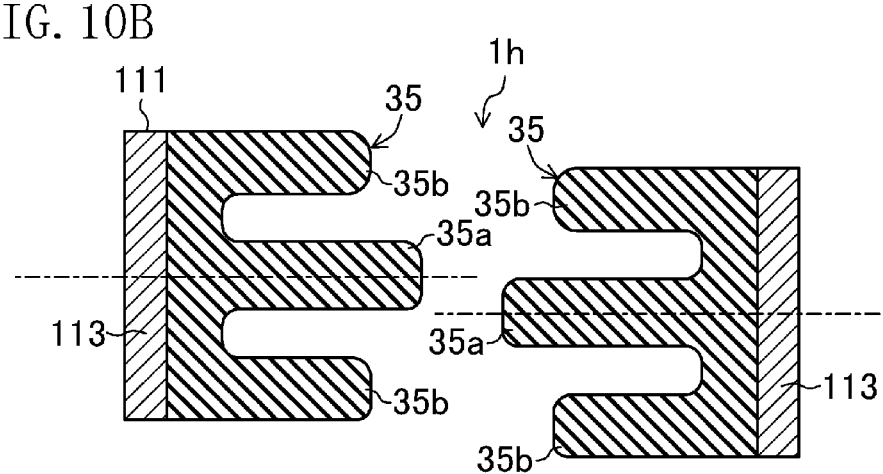
FIG. 10B is a view corresponding to the cross-sectional view taken along the line X-X in FIG. 6D showing a vibration isolator of an eighth alternative of the example embodiment.

FIG. 10B is a view corresponding to the cross-sectional view taken along the line X-X in FIG. 6D showing a vibration isolator 1h of an eighth alternative of the above-described embodiment. The vibration isolator 1h has a bracket 111 having a shape different from the shape of the bracket 31 of the vibration isolator 1 of the above-described embodiment. Specifically, a pair of opposing parts 113, 113 of the bracket 111 are misaligned in a direction perpendicular to the direction in which the opposing parts 113, 113 oppose to each other.

In this structure, even if the power train 23 is fixed to the vehicle at a position misaligned with peripheral components, the property of the stopper rubbers similar to that exerted in the vibration isolator 1 of the above-described embodiment can be obtained.

(Ninth Alternative)

Figure 10C:
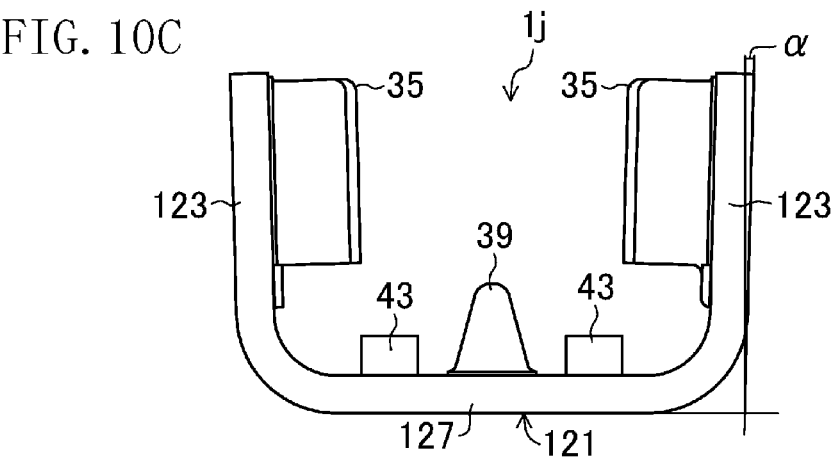
FIG. 10C is a view corresponding to FIG. 6D showing a vibration isolator of a ninth alternative of the example embodiment.

FIG. 10C is a view corresponding to FIG. 6D showing a vibration isolator 1j of a ninth alternative of the above-described embodiment. The vibration isolator 1j has a bracket 121 of a shape different from the shape of the bracket 31 of the vibration isolator 1 of the above-described embodiment. Specifically, an angle α formed by each of opposing parts 123 and a coupling part 127 can be changed as appropriate in accordance with installation conditions of the vibration isolator 1j.

(Tenth Alternative)

FIG. 11A is a perspective view showing a stopper rubber 135 of a vibration isolator of a tenth alternative of the above-described embodiment. FIG. 11B is a front view showing the stopper rubber 135 of the vibration isolator of the tenth alternative of the above-described embodiment. FIG. 11C is a side view showing the stopper rubber 135 of the vibration isolator of the tenth alternative of the above-described embodiment. The stopper rubber 135 is different from the stopper rubber 35 of the vibration isolator 1 of the above-described embodiment in that the stopper rubber 135 is substantially disk-shaped.

Specifically, the stopper rubber 135 has a disk-shaped base 135d arranged on the opposing part 33, a conical part 135a extending from the center of one of surfaces of the base 135d facing an axial direction thereof in the axial direction, and an annular part 135b protruding from an outer circumferential edge of the base 135d in the axial direction. An annular recess 135c (a gap) is formed between the annular part 135b and the conical part 135a.

In this structure, the conical part 135a is precompressed by the protruding tab 27 and the opposing part 33. The annular part 135b is spaced from the protruding tab 27, and the power train 23 contacts the protruding tab 27 when the power train 23 vibrates in the roll direction.

(Eleventh Alternative)

Figure 12A:
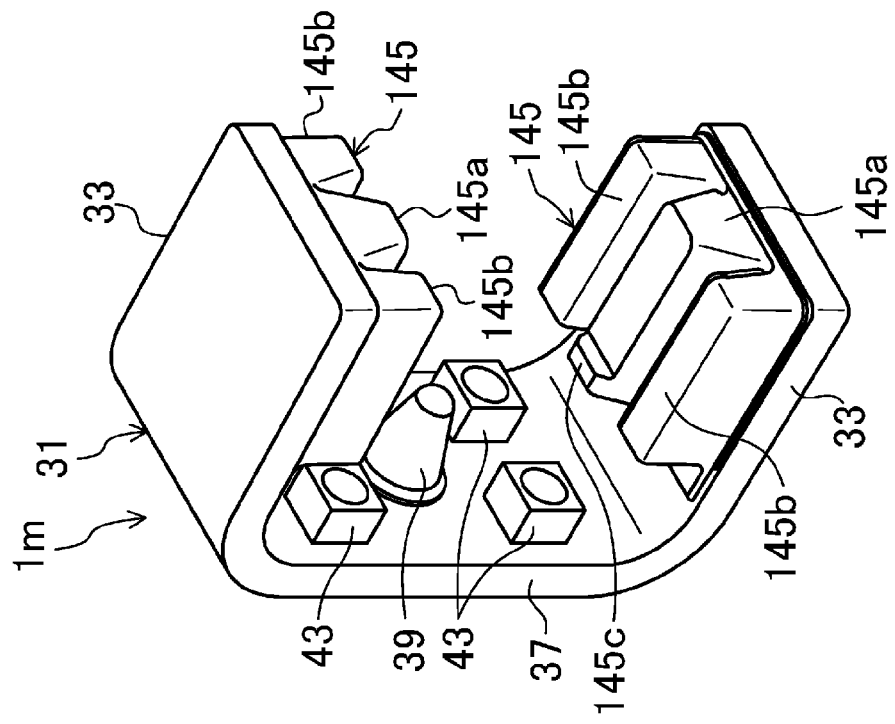
FIG. 12A is a perspective view showing a vibration isolator of an eleventh alternative of the example embodiment.
Figure 12B:
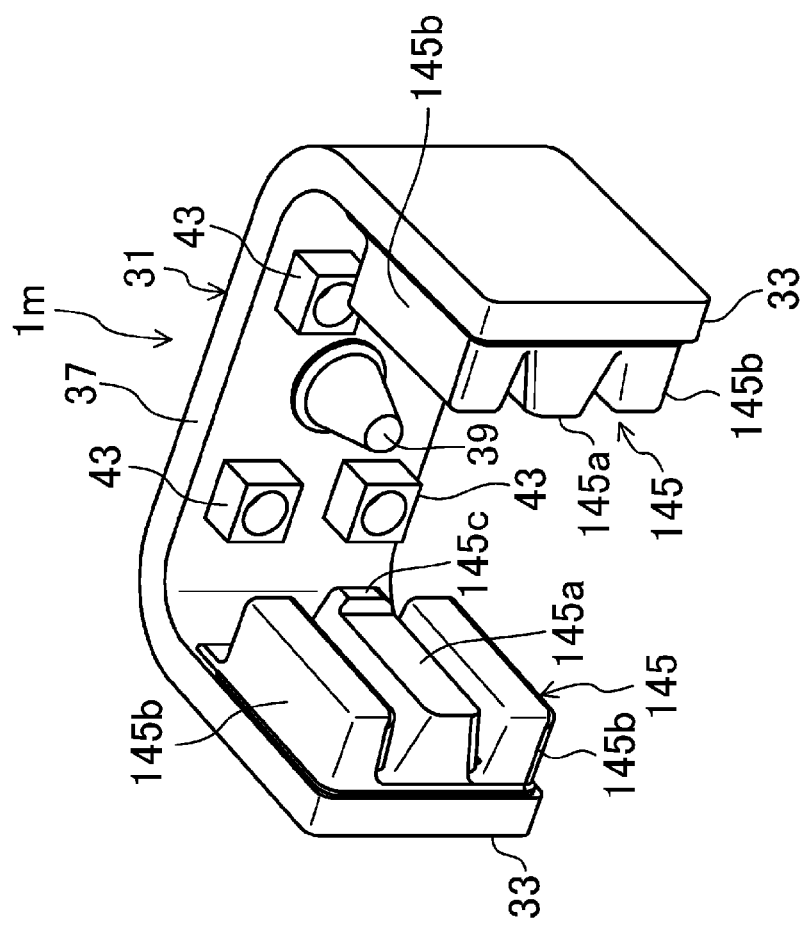
FIG. 12B is a perspective view showing the vibration isolator of the eleventh alternative of the example embodiment.
Figure 13A:
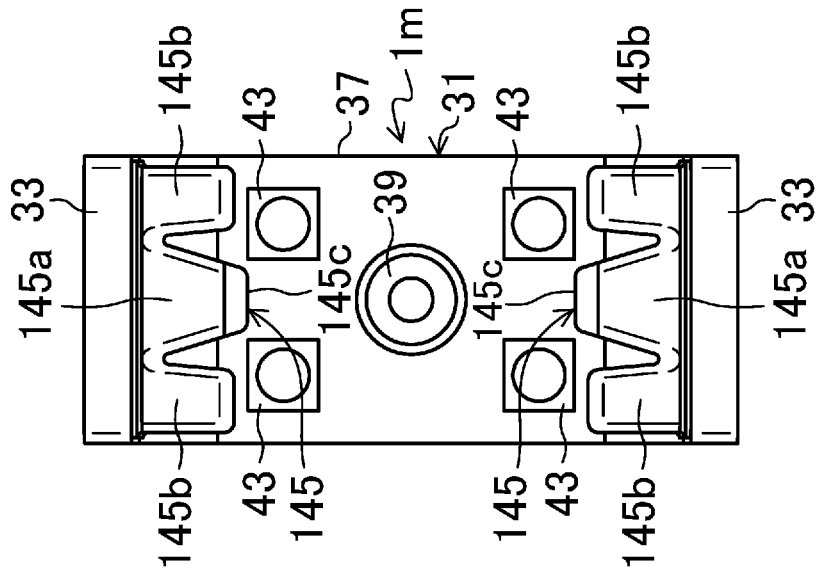
FIG. 13A is a plan view showing the vibration isolator of the eleventh alternative of the example embodiment.
Figure 13B:
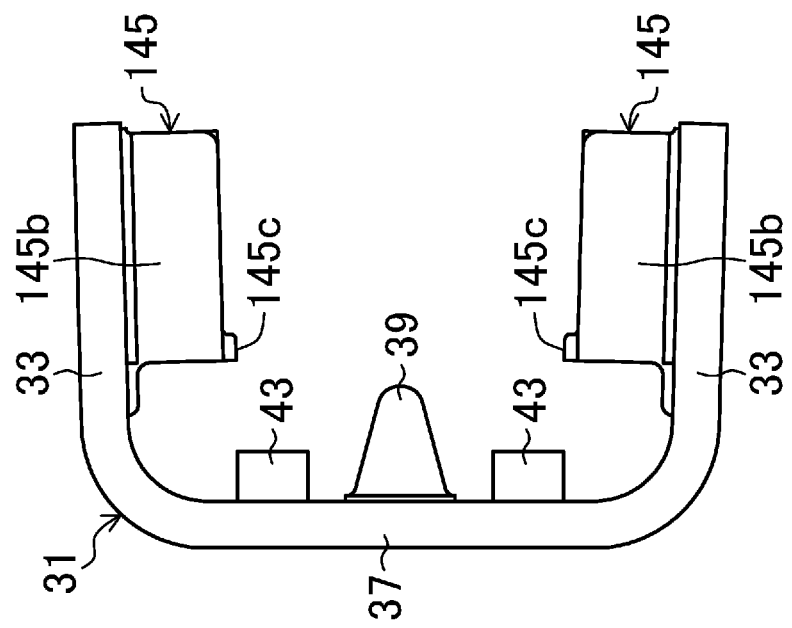
FIG. 13B is a side view showing the vibration isolator of the eleventh alternative of the example embodiment.

FIG. 12A and FIG. 12B are perspective views showing a vibration isolator 1m of an eleventh alternative of the above-described embodiment. FIG. 13A is a plan view showing the vibration isolator 1m, and FIG. 13B is a side view showing the vibration isolator 1m.

The vibration isolator 1m includes stopper rubbers 145 of a shape different from the shape of the stopper rubbers 35 of the vibration isolator 1 of the above-described embodiment. Other features of the vibration isolator 1m are substantially the same as those of the vibration isolator 1, and are not described in detail below.

Like the stopper rubbers 35 of the vibration isolator 1 of the above-described embodiment, each of the stopper rubbers 145 of the vibration isolator 1m includes three ribs 145a, 145b, 145b arranged in a width direction of the opposing parts 33. Each of the ribs 145a, 145b extends linearly in a longitudinal direction of the opposing parts 33. The center rib 145a has a trapezoidal cross section like the first rib 35a of the above-described embodiment. The ribs 145b, 145b on both sides of the center rib 145a have a substantially rectangular cross section like the second ribs 35b of the above-described embodiment.

The three ribs 145a, 145b, 145b have the same dimension in a protruding direction thereof. With the protruding tab 27 of the suspended power train 23 disposed between the stopper rubbers 145, 145, gaps are formed between the ribs 145a, 145b, 145b of the stopper rubbers and the end faces 27a of the protruding tab 27.

At an edge of the center rib 145a among the three ribs 145a, 145b, 145b facing the coupling part 37 of the bracket 31, a protrusion 145c (a precompressed part) is formed to protrude toward the opposing part 33 facing the center rib 145a. The protrusion 145c extends linearly in the width direction of the opposing part 33 at a protruding end face of the rib 145a. The protrusion 145c is precompressed by the protruding tab 27 and the opposing part 33 with the protruding tab 27 of the suspended power train 23 disposed between the stopper rubbers 145, 145.

In mounting the vibration isolator 1m on the side frame 25, the vibration isolator 1m is brought closer to the side frame 25 from the rear side of the protruding tab 27. At this time, the projection 39 contacts the protruding tab 27 of the power train 23 to determine the position of the vibration isolator 1 in the longitudinal direction. The protrusions 145c, 145c of the stopper rubbers 145, 145 position the center of the protruding tab 27 of the power train 23 in the roll direction to the center of the bracket 31. At the same time, the protrusions 145c are precompressed by the protruding tab 27 of the power train 23 and the opposing parts 33. Thus, the center rib 145a is precompressed to a minimum degree.

When the power train 23 is actuated in this state, the protruding tab 27 vibrates in the roll direction. Since the projections 145c are precompressed in an early stage of the vibration, the protruding tab 27 gently rotates. However, since the degree of the precompression is lower than that of the vibration isolator 1 of the above-described embodiment, the protruding tab 27 rotates more than the protruding tab 27 of the vibration isolator 1. As the protruding tab 27 keeps rotating, the protruding tab 27 contacts the three ribs 145a, 145b, and 145b. Thus, as compared with the above-described embodiment in which the protruding tab 27 contacts the two ribs 35b, 35b, the vibration amount of the engine can be reduced, while the degree of the precompression is reduced to reduce an initial spring constant.

Other Embodiments

In the above-described embodiment, the first rib 35a and the second ribs 35b, 35b of the stopper rubber 35 are integrally provided. However, the structure of the ribs is not limited thereto, and the first rib 35a and the second ribs 35b, 35b may independently be provided.

In the above-described embodiment, the vibration isolator 1 is configured to reduce the vibration of the power train 23 of the vehicle 3. However, the vibration isolator 1 is not limitedly applied to the power train of the vehicle, but may be applied to a power train of an industrial vehicle such as a folk lift, a towing vehicle, etc.

In the above-described embodiment, the protruding tab 27 extends obliquely downward from the outer circumferential edge of the power train 23. However, the protruding tab 27 is not limited thereto, and the protruding tab 27 may extend in a direction perpendicular to the principal axes of inertia X of the power train 23 and intersecting with the horizontal direction.

As described above, the disclosed technology can be applied to prevent vibration of a power train mounted on a vehicle in a roll direction from transmitting to a vehicle body.

What is claimed is:

1. A vibration isolator configured to reduce vibration of a power train mounted on a vehicle in a direction about principal axes of inertia of the power train, the vibration isolator comprising:
a pair of opposing members fixed to a vehicle body of the vehicle to be located on both sides of a protrusion in the direction about the principal axes of inertia, the protrusion protruding from an outer circumferential edge of the power train in a direction perpendicular to the principal axes of inertia, so that the opposing members oppose to each other in the direction about the principal axes of inertia;
a precompressed part provided on part of each of the opposing members facing the protrusion to be precompressed by the opposing member and the protrusion in the direction about the principal axes of inertia; and
a contacting part provided on the part of each of the opposing members facing the protrusion to be spaced from the protrusion, and contacts the protrusion when the power train vibrates in the direction about the principal axes of inertia, wherein
the precompressed part and the contacting part are provided on each of the opposing surfaces of the opposing members.

2. The vibration isolator of claim 1, wherein
the principal axes of inertia extend in a substantially horizontal direction,
a protruding direction of the protrusion intersects with the horizontal direction, and
the precompressed parts and the contacting parts extend in a direction substantially perpendicular to the protrusion.

3. The vibration isolator of claim 2, wherein
parts of the protrusion facing the opposing members are flat along the protruding direction of the protrusion, and
the precompressed parts extend to be closer to the protrusion than the contacting parts.

4. The vibration isolator of claim 3, wherein
a gap is formed between the precompressed part and the contacting part provided on the same opposing member.

5. The vibration isolator of claim 1, wherein
an end of one of the opposing members and an end of the other opposing member on one side in a direction of the principal axes of inertia are coupled by a coupling member, and
a projection for positioning the protrusion in the direction of the principal axes of inertia is formed on part of the coupling member facing the protrusion.

6. The vibration isolator of claim 1, wherein
each of the pair of opposing members has an end on one side in the direction of the principal axes of inertia, the ends being coupled to each other via a coupling member, and
the opposing members and the coupling member form a U-shaped cross section.

* * * * *